(12) United States Patent
Harter

(10) Patent No.: US 11,807,311 B2
(45) Date of Patent: Nov. 7, 2023

(54) AIR GUIDE DEVICE OF A MOTOR VEHICLE BODY

(71) Applicant: Dr. Ing. h.c. F. Porsche Aktiengesellschaft, Stuttgart (DE)

(72) Inventor: Sebastian Harter, Weissach (DE)

(73) Assignee: Dr. Ing. h.c. F. Porsche Aktiengesellschaft

( * ) Notice: Subject to any disclaimer, the term of this patent is extended or adjusted under 35 U.S.C. 154(b) by 19 days.

(21) Appl. No.: 17/678,186

(22) Filed: Feb. 23, 2022

(65) Prior Publication Data

US 2022/0289315 A1    Sep. 15, 2022

(30) Foreign Application Priority Data

Mar. 9, 2021   (DE) .................... 10 2021 105 567.9

(51) Int. Cl.
*B62D 35/00*    (2006.01)
*B60K 11/08*    (2006.01)
*B62D 5/00*     (2006.01)

(52) U.S. Cl.
CPC ........... *B62D 5/005* (2013.01); *B60K 11/085* (2013.01)

(58) Field of Classification Search
CPC ...... B60K 11/08; B60K 11/085; B62D 35/00; B62D 35/005; B62D 35/008
USPC ............................................ 296/180.2, 180.5
See application file for complete search history.

(56) References Cited

U.S. PATENT DOCUMENTS

| | | | |
|---|---|---|---|
| 8,161,919 B2 | 4/2012 | Klotz et al. | |
| 8,347,830 B2 | 1/2013 | Tregnago et al. | |
| 8,602,486 B2 | 12/2013 | Roemer et al. | |
| 9,637,180 B2* | 5/2017 | Wolf | B60K 11/04 |
| 9,676,269 B2 | 6/2017 | Jeong | |
| 9,694,858 B2 | 7/2017 | Wolf | |
| 2012/0071075 A1* | 3/2012 | Wolf | B60T 5/00 454/162 |

(Continued)

FOREIGN PATENT DOCUMENTS

| | | |
|---|---|---|
| DE | 102008062150 A1 | 6/2010 |
| DE | 102014110198 A1 | 1/2016 |

(Continued)

OTHER PUBLICATIONS

English translation of DE 10 2017 107 240; retrieved via Patent-Translate located at www.epo.org (Year: 2023).*

(Continued)

*Primary Examiner* — Jason S Daniels
(74) *Attorney, Agent, or Firm* — RatnerPrestia

(57) ABSTRACT

An air guide device of a motor vehicle body has a flow channel including an inlet opening and an outlet opening. The inlet opening is formed in a front-end region and the outlet opening is formed at least partially in the region of a wheel arch of the motor vehicle body. The flow channel is provided for being flowed through by air from the front-end region of the motor vehicle body in the region of a rear end of the motor vehicle body. The inlet opening has a slat arrangement for changing a flow cross section of the inlet opening. The flow channel is at least partially of two-part form, wherein a first channel part, which includes the slat arrangement, is designed for a controlled throughflow, and wherein a second channel part can be flowed through freely.

14 Claims, 3 Drawing Sheets

(56) References Cited

U.S. PATENT DOCUMENTS

| | | | |
|---|---|---|---|
| 2016/0016617 A1* | 1/2016 | Wolf | B60K 11/04 |
| | | | 296/208 |
| 2016/0272258 A1 | 9/2016 | Gibson et al. | |
| 2017/0082092 A1 | 3/2017 | Gaither | |
| 2017/0355333 A1 | 12/2017 | Kishima | |
| 2018/0340735 A1* | 11/2018 | Takaishi | F16H 57/0417 |
| 2021/0268978 A1* | 9/2021 | Harter | B60K 11/085 |

FOREIGN PATENT DOCUMENTS

| | | | |
|---|---|---|---|
| DE | 102016115514 A1 | | 2/2018 |
| DE | 102017107240 A1 | * | 4/2018 |
| DE | 102018002603 A1 | * | 8/2018 |
| DE | 102018002603 A1 | | 8/2018 |
| DE | 102018213034 A1 | | 2/2020 |
| EP | 2636540 A1 | | 9/2013 |
| WO | 2017218105 A1 | | 12/2017 |

OTHER PUBLICATIONS

Chinese Office Action for Chinese Application No. 202210224610.4, dated Jul. 29, 2023 with English Search Report, 14 pages.

\* cited by examiner

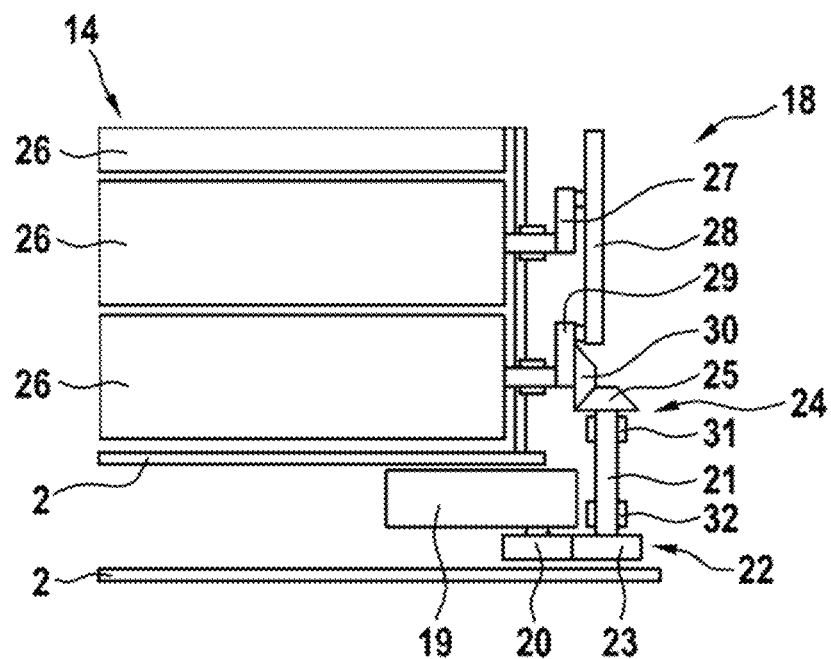

AIR GUIDE DEVICE OF A MOTOR VEHICLE BODY

CROSS-REFERENCE TO RELATED APPLICATION

This application claims priority to German Patent Application No. 10 2021 105 567.9, filed Mar. 9, 2021, the content of such application being incorporated by reference herein in its entirety.

FIELD OF THE INVENTION

The present invention relates to an air guide device for a motor vehicle body.

BACKGROUND OF THE INVENTION

Air guide devices for influencing an air flow passing around the motor vehicle body are known. Air guide devices are used in the rear-end region of the motor vehicle body and in the front-end region of the motor vehicle body. Such air guide devices may for example be so-called front spoilers, which make it possible to realize a defined air flow in the front-end region of the motor vehicle body.

It is known for flow channels of the air guide devices in the front-end region to be equipped with a slat arrangement, preferably a movable slat arrangement, in order that the by means of an inlet opening, formed in the front-end region, of the air guide device can be varied, that is to say controlled. In this way, a flow cross section of the flow channel can be changed by means of the slat arrangement in order that an air resistance coefficient and an energy requirement dependent on the air resistance coefficient can be reduced, leading to an increased range of the motor vehicle.

U.S. Pat. No. 9,676,269 B2, which is incorporated by reference herein, discloses, for example, an air guide device, the air inlet opening of which can be varied in terms of the flow cross section thereof by means of a slat arrangement, wherein an actuator is configured for adjusting the slat arrangement.

EP 2 636 540 B1, which is incorporated by reference herein, discloses an air guide device of a motor vehicle body, the inlet openings of which can be closed by means of a flap, wherein the flap is configured to be movable by means of an actuator. The air guide device serves for cooling a brake.

U.S. Pat. No. 8,347,830 B2, which is incorporated by reference herein, discloses an air guide device of a motor vehicle body, having a flow channel which has its inlet opening in the front-end region and its outlet opening on an underside of the motor vehicle body, wherein a slat arrangement for changing a flow cross section is provided downstream of a fan impeller. The air can thus entirely or partially, or when the slat arrangement is fully closed, impinge on or flow around a drive assembly of the motor vehicle for the purposes of cooling said drive assembly.

U.S. Pat. No. 8,161,919 B2, which is incorporated by reference herein, has disclosed an air guide device of a motor vehicle body, which air guide device is accommodated centrally in the front-end region of the motor vehicle body, wherein two mutually adjacently arranged slat arrangements are accommodated in an inlet opening of the air guide device, which slat arrangements are actuatable by means of a single actuator.

WO 2017/218105 A1, which is incorporated by reference herein, discloses an air guide device of a motor vehicle body, having a flow channel which has an inlet opening in the front-end region of the motor vehicle body and its outlet opening in a fender of the motor vehicle body above a wheel arch of the motor vehicle body, wherein a movable slat arrangement is formed in the outlet opening.

SUMMARY OF THE INVENTION

Described herein is an improved air guide device of a motor vehicle body.

An air guide device according to aspects of the invention of a motor vehicle body has a flow channel comprising an inlet opening and an outlet opening, wherein the inlet opening is formed in a front-end region and the outlet opening is formed at least partially in the region of a wheel arch of the motor vehicle body. The flow channel is provided for being flowed through by air from the front-end region of the motor vehicle body in the direction of a rear end of the motor vehicle body. The inlet opening has a slat arrangement for changing a flow cross section of the inlet opening. According to aspects of the invention, the flow channel is at least partially of two-part form, wherein a first channel part, which comprises the slat arrangement, is designed for a controlled throughflow, and wherein a second channel part can be flowed through freely (i.e., without resistance or without significant resistance or of less resistance than the first portion), wherein the second channel part has, in the outlet opening, an outlet area which is designed for guiding air that flows at least through the second channel part past a wheel that is arranged in the wheel arch. The first and second channel parts may be arranged in parallel (fluidly speaking). The advantage is the combination, in a single flow channel, of a controllable flow channel, which can be used for example for cooling a drive assembly of a motor vehicle that has the motor vehicle body, and of a flow channel which to divert air impinging on the front-end region past the wheel of the motor vehicle in order to avoid turbulence, which increases the air resistance coefficient, at the wheel. It is thus made possible for the air resistance coefficient to be reduced to a minimum.

The flow channel is advantageously divided in the direction of a body longitudinal axis of the motor vehicle body, in order that a throughflow is possible in the direction of a body longitudinal axis of the motor vehicle body, or in other words in a direction of travel from front to rear, whereby the air resistance coefficient can be significantly reduced.

If the first channel part is arranged so as to face away from a wheel arch and the second channel part is arranged so as to face toward the wheel arch, it is possible to realize simple channel guidance of the flow channel for the cooling of assemblies, which are positioned under a front hood, by means of the first channel part and the outflow of air past the wheel by means of the second channel part.

The slat arrangement advantageously has a movement device in order that it can be controlled in an operation-dependent manner.

In order to further reduce the air resistance coefficient, the movement device comprises an actuator which is arranged on the motor vehicle body below the slat arrangement in the direction of a motor vehicle vertical axis, in particular in order that the air flowing into the second channel part is prevented or substantially prevented from impinging on the actuator.

An output of the actuator is operatively connected by means of a drive shaft to a distributor that is operatively connected to individual slats of the slat arrangement, in order that the slats can be adjusted simultaneously in a simple manner.

If the drive shaft is in the form of a vertical shaft comprising a bevel gear, it is made possible for the actuator to be positioned upside down and below the slat arrangement so as to be protected against contamination.

BRIEF DESCRIPTION OF THE DRAWINGS

Further advantages, features and details of the invention will emerge from the following description of preferred exemplary embodiments and from the drawing. The features and feature combinations mentioned above in the description and the features and feature combinations mentioned below in the description of the figures and/or shown in the figures alone are able to be used not only in the respectively specified combination but also in other combinations or individually without departing from the scope of the invention. Identical or functionally identical elements are denoted by identical reference signs. For the sake of clarity, it may be the case that the elements are not denoted by their reference signs in all of the figures, but this does not eliminate the assignment thereof. In the figures:

FIG. 5 shows, in a section IV-IV, the air guide device as per FIG. 3.

DETAILED DESCRIPTION OF THE INVENTION

Figure 1:
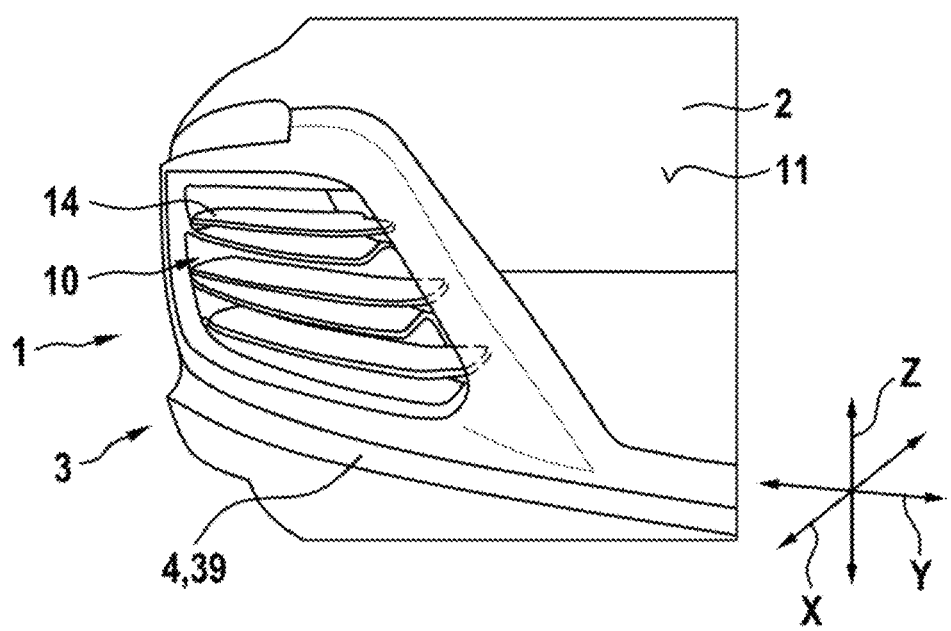
FIG. 1 is a perspective illustration of a motor vehicle body having an air guide device, which has a slat arrangement, according to the prior art.

An air guide device 1, configured according to the prior art, of a motor vehicle body 2 is configured as illustrated in FIG. 1. The motor vehicle body 2 has, in a front-end region 3, a body section 4 in the form of a so-called front skirt or of a so-called front spoiler. Said body section 4, together with a so-called fender 5 of the motor vehicle body 2, as is shown by way of example in FIG. 2, at least partially forms a wheel arch 6 of the motor vehicle body 2, in which a wheel 7 of a motor vehicle 8 that has the motor vehicle body 2 is arranged so as to be rotatable about its wheel axle 9.

In the context of the present invention, the front-end region 3 is in this case in particular that region of the motor vehicle body 2 which is situated in front of the wheel 7 of the motor vehicle body 2.

In the region of the wheel arch 6, there is formed a flow channel 10 which is situated under an outer skin 11 of the motor vehicle body 2 and thus so as to be predominantly not visible from the outside.

An inlet opening 12 of the flow channel 10 is configured so as to extend predominantly along a body vertical axis Z of the motor vehicle body 2 and a body transverse axis Y of the motor vehicle body 2 in order that, during the operation of the motor vehicle 8, air can flow into the flow channel 10 via the inlet opening 12 and can flow out via an outlet opening 13 arranged downstream of the inlet opening 12. The inlet opening 12 has multiple adjustably configured slat arrangement 14 for changing a flow cross section of the inlet opening 12 and for at least partially diverting the inflowing air. In the present example, a slat 26 of the slat arrangement 14 is configured as a horizontally situated slat 26. It could likewise also be designed in the form of a vertical slat 26.

That is to say, air can flow into the flow channel 10 via the inlet opening 12. Said air may be used for example for cooling components, for example radiators and/or brakes, arranged in the front-end region 3. In order to increase the efficiency of the flow channel 10, the inlet opening 12 of the flow channel 10 is formed on a front-end component 39, in particular a front skirt of the motor vehicle body 2. The air that impinges frontally on the motor vehicle body 2 is thus guided directly into the inlet opening 12 and thus into the flow channel 10.

Figure 2:
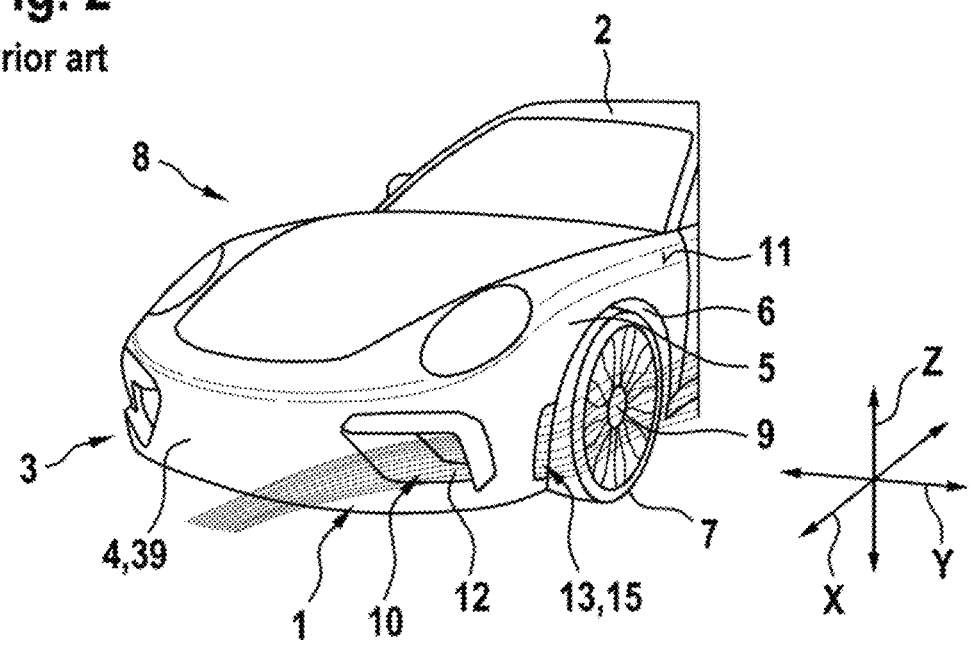
FIG. 2 is a perspective illustration of the motor vehicle body having the air guide device according to the prior art in a further example, with a visualization of the air flow that is diverted by means of the air guide device.

FIG. 2 shows a further air guide device 1 according to the prior art, wherein the air flowing into the inlet opening 12 is visualized in the form of flow filaments. An outlet area 15, formed upstream of the outlet opening 13, of the flow channel 10 is configured to be inclined in the direction of the body transverse axis Y in order that, as illustrated in FIG. 2, the air exiting the flow channel 10 is diverted by means of the flow channel 10 so as to flow past the wheel 7. This means that the air does not impinge on the wheel 7 after exiting the outlet opening 13, wherein said air would increase an air resistance coefficient $c_w$ in particular owing to turbulence if it were to impinge on the wheel 7, but is conducted past the wheel 7. Since the air flowing out of the outlet opening 13, if visualized, has a "curtain"-like appearance, the flow channel 10 shown in FIG. 2 is also referred to as "air curtain".

Figure 3:
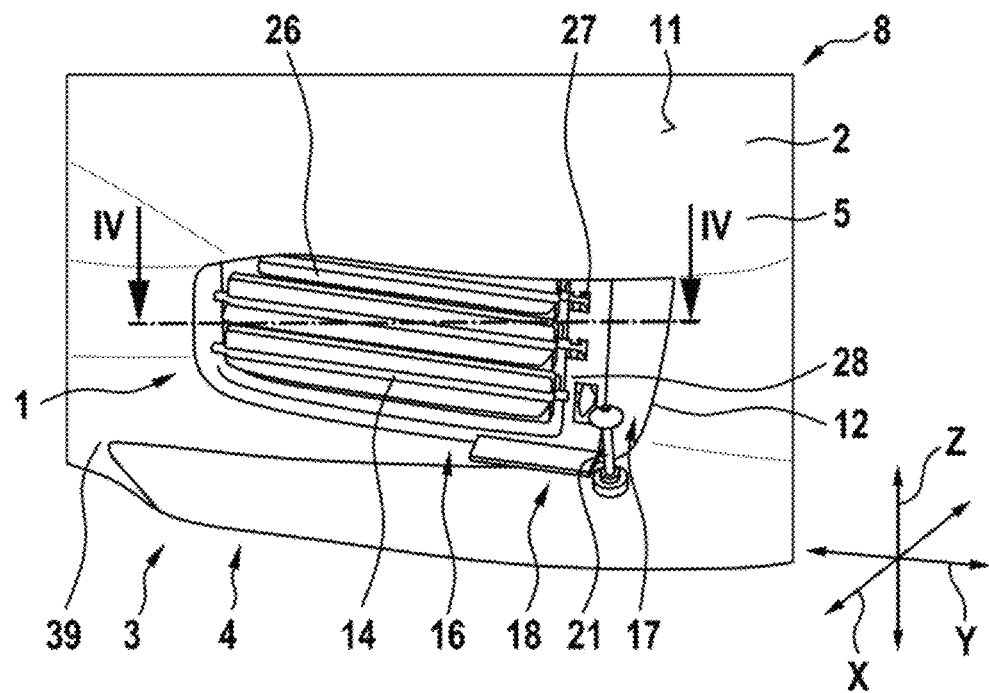
FIG. 3 shows, in a front view, an air guide device according to aspects of the invention of a motor vehicle body.
Figure 4:
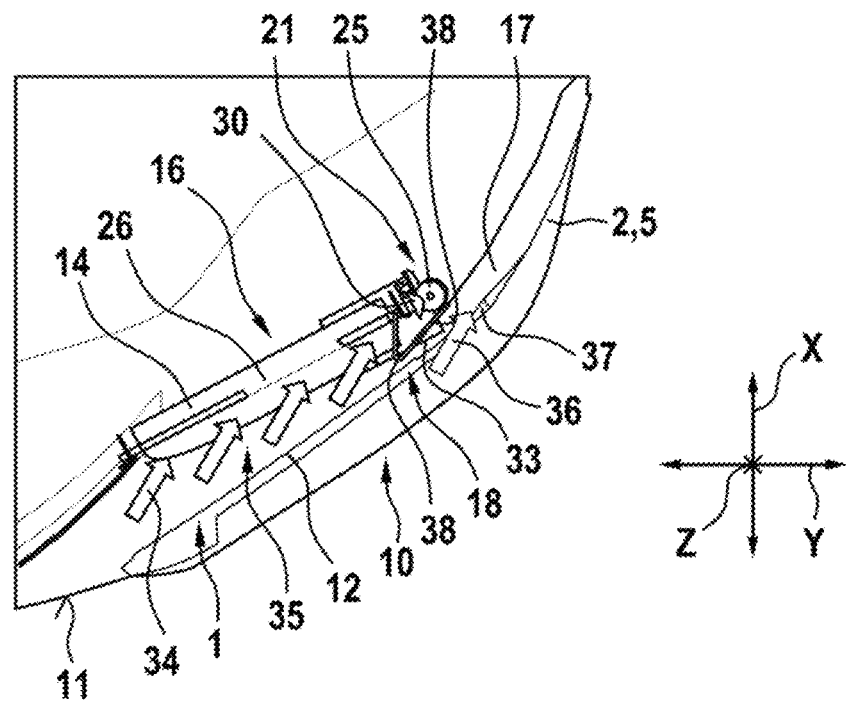
FIG. 4 shows, in a further front view, the air guide device according to aspects of the invention as per FIG. 3.

An air guide device 1 according to aspects of the invention is configured as per FIGS. 3 to 5. The flow channel 10 is designed to be divided into two parts along a body longitudinal axis X of the motor vehicle body 2, wherein a first channel part 16 comprises the slat arrangement 14 and the second channel part 17 is configured in the form of the air curtain. In other words, this means that the first channel part 16 is designed to change its flow cross section by means of the slat arrangement 14, and the second channel part 17 can be flowed through freely. This means that the flow cross section of the second channel part 17 is not controlled.

An intermediate wall 38, which serves for further flow diversion, may be formed downstream of the slat arrangement 14 between the first channel part 16 and the second channel part 17. Said intermediate wall may extend all the way through the flow channel 10 in the direction of the body longitudinal axis X, and may likewise also be formed in sections in the flow channel 10, preferably close to the inlet opening 12, as illustrated by way of example in FIG. 4. The flow channel 10 is thus divided in the direction of the body longitudinal axis X.

The first channel part 16 is arranged so as to face away from the wheel arch 6, and the second channel part 17 is arranged so as to face toward the wheel arch 6. In other words, this means that, as viewed over the body transverse axis Y, the second channel part 17 is configured to be close to the wheel and the first channel part 16 is configured to be remote from the wheel.

The slats 26 are configured to extend predominantly in the direction of the body transverse axis Y. In order that the adjustment of the inclination angle of said slats is possible without influencing, or without significant influencing, of the air flow through the second channel part 17, the slat arrangement 14 has a movement device 18 whose actuator 19 is arranged on the motor vehicle body 2 below the slat arrangement 14 in the direction of the body vertical axis Z.

An output 20 of the actuator 19 is connected in positively locking and force-transmitting fashion to a drive shaft 21 of the movement device 18, which drive shaft, at its first end 22 configured to face toward the output 20, has a simple toothed gear in the form of a spur gear 23 and, at its second end 24 configured to face away from the first end 22, has a bevel gear 25, such that the drive shaft 21 is configured in the form of a so-called vertical shaft. The output 20 is likewise configured in the form of a spur gear, and is arranged so as to face in the direction of the motor vehicle vertical axis Z toward a roadway.

Each slat 26 of the slat arrangement 14 is assigned a driver 27 which is configured to be operatively connected to the drive shaft 21 by means of a distributor 28 that is configured in the form of a rail.

The slat 26 which is situated closest to the actuator 19 is connected to a main driver 29, which is equipped with a further bevel gear 30 which engages with the bevel gear 25 of the drive shaft 21. The distributor 28 is thus designed to be operatively connected to the drive shaft 21 by means of the further bevel gear 30.

A transmission of force thus takes place from the actuator 19 via a spur gear pair, which is formed by the output 20 and the spur gear 23, via the drive shaft 21, and via a bevel gear pair, which is formed by the bevel gear 25 and the further bevel gear 30, to the main driver 29. Said main driver directly controls the slat 26 situated closest to the actuator 19, and controls the other slats 26 of the slat arrangement 14 via the distributor 28.

The drive shaft 21 is mounted rotatably by means of a first plain bearing 31 and a second plain bearing 32, which are each arranged close to an end.

In order to protect against contamination, and for further flow guidance, the movement device 18 is assigned a trim panel 33, which is arranged in front of the distributor 28 as viewed in the direction of the wheel 7. The trim panel 33 is additionally configured for the mounting of the drivers 27, 29, which are of L-shaped design.

An inflow of the air into a first air inlet 35, which is assigned to the first channel part 16, of the flow channel 10 is illustrated by means of the first flow arrows 34, and the inflow of the air into a second air inlet 37, which is assigned to the second channel part 17, of the flow channel 10 is illustrated by means of the second flow arrow 36.

In order to prevent turbulence, the intermediate wall 38 is formed, which is arranged between the first channel part 16 and the second channel part 17.

The motor vehicle body 2 may be configured to accommodate a drive assembly in the form of an internal combustion engine and/or an electric motor. By means of the air guide device 1 according to aspects of the invention, the range of the motor vehicle 8 is greatly increased in relation to the prior art, because the air resistance coefficient is greatly reduced.

LIST OF REFERENCE SIGNS

1 Air guide device
2 Motor vehicle body
3 Front-end region
4 Body section
5 Fender
6 Wheel arch
7 Wheel
8 Motor vehicle
9 Wheel axle
10 Flow channel
11 Outer skin
12 Inlet opening
13 Outlet opening
14 Slat arrangement
15 Outlet area
16 First channel part
17 Second channel part
18 Movement device
19 Actuator
20 Output
21 Drive shaft
22 First end
23 Spur gear
24 Second end
25 Bevel gear
26 Slat
27 Driver
28 Distributor
29 Main driver
30 Further bevel gear
31 First plain bearing
32 Second plain bearing
33 Trim panel
34 First flow arrow
35 First air inlet
36 Second flow arrow
37 Second air inlet
38 Intermediate wall
39 Front component
X Body longitudinal axis
Y Body transverse axis
Z Body vertical axis

What is claimed is:

1. An air guide device of a motor vehicle body of a motor vehicle, said air guide device comprising:
   a flow channel comprising an inlet opening and an outlet opening,
   wherein the inlet opening is formed in a front-end region of the motor vehicle body and the outlet opening is formed at least partially in a region of a wheel arch of the motor vehicle body,
   wherein the flow channel is sized to receive a flow of air from the front-end region of the motor vehicle body that flows in a direction toward a rear end of the motor vehicle body, wherein the flow channel is at least partially of two-part form and is delineated by an intermediate wall to define a first channel part and a second channel part, wherein the first and second channel parts are separated by the intermediate wall,
   wherein the first channel part of the flow channel includes a slat arrangement disposed in the inlet opening for changing a flow cross section of the inlet opening, wherein the first channel part is configured for a controlled throughflow of air,
   wherein the slat arrangement comprises a plurality of moveable slats and a movement device for moving the plurality of slats between an open position in which air is permitted to flow through the first channel part and a closed position in which air is limited from freely flowing through the first channel part, wherein at least a portion of the movement device is located within the first channel part at a position that is behind a leading edge of the intermediate wall as viewed in a direction of air flow through the first channel part,
   wherein the second channel part of the flow channel is configured to be flowed through freely by air, and
   wherein the second channel part has, in the outlet opening, an outlet area which is configured for guiding air that flows through the second channel part and past a wheel of the motor vehicle that is arranged in the wheel arch.

2. The air guide device as claimed in claim 1, wherein the flow channel is divided in a direction of a body longitudinal axis (X) of the motor vehicle body.

3. The air guide device as claimed in claim 1, wherein the movement device comprises an actuator which is arranged on the motor vehicle body below the slat arrangement in a direction of a motor vehicle vertical axis (Z) of the motor vehicle body.

4. The air guide device as claimed in claim 3, wherein an output of the actuator is operatively connected by way of a drive shaft to a distributor that is operatively connected to the moveable slats of the slat arrangement.

5. The air guide device as claimed in claim 4, wherein the drive shaft is a vertical shaft comprising a bevel gear.

6. The air guide device as claimed in claim 5, wherein the distributor is configured to be operatively connected to the drive shaft by way of a further bevel gear.

7. The air guide device as claimed in claim 6, wherein the further bevel gear is connected to a main driver, which is operatively connected to the distributor.

8. The air guide device as claimed in claim 5, wherein the drive shaft is located behind the leading edge of the intermediate wall as viewed in the direction of air flow through the first channel part.

9. The air guide device as claimed in claim 4, wherein the output is arranged so as to face at least partially in the direction of the motor vehicle vertical axis (Z) toward a roadway.

10. A motor vehicle comprising the air guide device of claim 1.

11. The air guide device as claimed in claim 1, wherein each slat is disposed horizontally across the first channel part, and an axis of rotation of each slat is also disposed horizontally across the first channel part.

12. The air guide device as claimed in claim 1, wherein the intermediate wall has a V-shape, as viewed in cross-section, and a pointed edge of the V-shape points away from the inlet opening.

13. The air guide device as claimed in claim 12, wherein the pointed edge forms the leading edge of the intermediate wall.

14. The air guide device as claimed in claim 1, wherein the intermediate wall is at least partially formed by an exterior trim panel of the motor vehicle body.

* * * * *